United States Patent Office 2,728,779
Patented Dec. 27, 1955

2,728,779

ESTERS OF SUBSTITUTED AMINOBUTANES

Albert Pohland, Indianapolis, Ind., assignor to Eli Lilly and Company, Indianapolis, Ind., a corporation of Indiana No Drawing. Application December 3, 1952, Serial No. 323,947

6 Claims. (Cl. 260—326.3)

This invention relates to substituted 1,2-diphenylbutanes and more particularly to esters of 1,2-diphenyl-2-hydroxy-3-methyl-4-(substituted amino)-butanes and their acid addition salts.

The bases of the compounds of the invention can be represented by the formula:

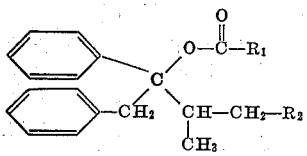

wherein $R_1$ is a member of the group consisting of methyl and ethyl radicals and $R_2$ is a member of the group consisting of dimethylamino and pyrrolidino radicals. The bases of the new compounds are water-insoluble, low-melting solids which are soluble in the common organic solvents. The bases form acid addition salts which are generally water-soluble.

The new substituted diphenylbutanes and their acid addition salts are analgesics, and are characterized by their ability to produce analgesia without toxic side effects such as respiratory depression. The compounds can be utilized for therapeutic use by parenteral injection in aqueous solution or other pharmaceutical extending media, or they may be administered orally in pharmaceutical preparations suitable for that purpose, such as tablets, capsules, elixirs, suspensions and the like.

The substituted diphenylbutanes can readily be prepared by methods known to the art. The following series of equations, which illustrates the preparation of 1,2-diphenyl-2-propionoxy-3-methyl-4-pyrrolidinobutane hydrochloride, exemplifies the production of the compounds:

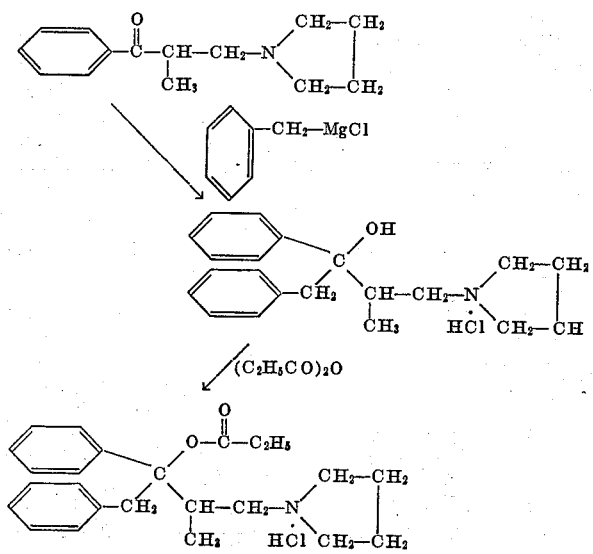

Referring to the equations, it will be seen that α-methyl-β-pyrrolidinopropiophenone is reacted with benzylmagnesium chloride to form 1,2-diphenyl-2-hydroxy-3-methyl-4-pyrrolidinobutane hydrochloride, which is esterified with propionic anhydride to form 1,2-diphenyl-2-propionoxy-3-methyl-4-pyrrolidinobutane hydrochloride.

As is evident from the structural formula of the compounds, the new esters of substituted diphenylbutanes contain a basic nitrogen atom, which can react with acids to form acid addition salts. Such salts are readily prepared by the action of stoichiometrically equivalent amounts of the desired base and a selected acid in a mutual solvent. Examples of acids which are suitable for the preparation of acid addition salts are inorganic acids, such as, for example, hydrochloric, sulfuric, nitric, phosphoric and the like acids; and organic acids, such as, for example, benzoic, acetic, salicylic, propionic, maleic, citric and the like acids. Preferably, the pharmaceutically useful acids, i. e. acids that form salts which are not materially more toxic or irritating than the bases themselves, are used.

The esterified substituted diphenylbutanes each possess two centers of asymmetry, and therefore occur in diastereoisomeric forms. In accordance with the usual practice, the less soluble diastereoisomer is designated as the α-dl isomer, and the more soluble as the β-dl isomer; and that terminology is used herein to designate the substituted diphenylbutanes of this invention. The α-dl diastereoisomers are the preferred compounds of the invention since they possess marked analgesic activity in contrast to the β-dl diastereoisomers, which are substantially inactive.

The following examples more specifically illustrate the preparation of the new compounds and their salts.

EXAMPLE 1

Preparation of 1,2-diphenyl-2-propionoxy-3-methyl-4-dimethylaminobutane hydrochloride A solution of benzylmagnesium chloride prepared from 63.3 g. (0.5 mol.) of benzyl chloride, 30.5 g. (1.25 mole.) of magnesium and 750 cc. of ether was added dropwise with stirring to a solution of 61.9 g. (0.35 mol.) of α-methyl-β-dimethylaminopropiophenone (prepared by the method of Burchalter et al., J. A. C. S. v. 70 p. 4186, 1948), in 150 cc. of ether. When all of the Grignard reagent had been added, the solution was refluxed for about one hour. The reaction mixture was then decomposed by the addition of a saturated aqueous ammonium chloride solution. The ether solution containing the 1,2-diphenyl-2-hydroxy-3-methyl-4-dimethylaminobutane formed in the reaction was decanted from the granular precipitate and dried over anhydrous magnesium sulfate. Dry hydrogen chloride gas was passed into the ether solution until precipitation was completed. The solid was removed by filtration and was recrystallized from a mixture of methanol and ethyl acetate. The α-dl-1,2-hydroxy-3-methyl-4-dimethylaminobutane thus obtained melted at about 231–232° C.

Analysis:
  Calculated for $C_{19}H_{25}NO \cdot HCl$: N, 4.38; Cl, 11.10
  Found: N, 4.57; Cl, 11.11

A mixture of 50 g. of α-dl-1,2-diphenyl-2-hydroxy-3-methyl-4-dimethylaminobutane hydrochloride, 50 g. of propionic anhydride and 50 cc. of pyridine was refluxed for about five hours. The reaction mixture was cooled to 50° C. and ethyl ether was added to the point of incipient precipitation. The hydrochloride salt of α-dl-1,2 - diphenyl - 2 - propionoxy - 3 - methyl - 4 - dimethylaminobutane formed in the reaction precipitated upon cooling and was removed by filtration and washed with anhydrous ether. On recrystallization from a mixture of methanol and ethyl acetate, α-dl-1,2-diphenyl-2-propionoxy-3-methyl-4-dimethylaminobutane hydrochloride melted at 170–171° C.

Analysis:
Calculated for $C_{22}H_{29}NO_2 \cdot HCl$: N, 3.72; Cl, 9.43
Found: N, 3.63; Cl, 9.54

EXAMPLE 2

*Preparation of 1,2-diphenyl-2-acetoxy-3-methyl-4-dimethylaminobutane hydrochloride*

A reaction mixture containing 5 gms. of α-dl-1,2-diphenyl-2-hydroxy-3-methyl-4-dimethylaminobutane hydrochloride (prepared according to the procedure of Example 1 and melting at about 231–232° C.), 5 ml. of acetic anhydride and 25 ml. of pyridine was heated on a steam bath for sixteen hours. The reaction mixture was cooled and ether was added to the point of incipient precipitation, and the mixture was cooled in the refrigerator. The resulting crystalline precipitate of α-dl-1,2 - diphenyl - 2 - acetoxy - 3 - methyl - 4 - dimethylaminobutane hydrochloride was recrystallized from a mixture of methanol and ethyl acetate, and was found to melt at 177–178° C.

Analysis:
Calculated for $C_{21}H_{27}NO_2 \cdot HCl$: N, 3.88; Cl 9.83
Found: N, 3.59; Cl, 9.71

EXAMPLE 3

*Preparation of 1,2-diphenyl-2-propionoxy-3-methyl-4-pyrrolidinobutane hydrochloride*

A reaction mixture containing 108 g. of pyrrolidine hydrochloride, 134 g. of propiophenone, 39.4 g. of p-formaldehyde, 200 ml. of ethanol and 1.7 ml. of concentrated hydrochloric acid was refluxed overnight. The ethanol was removed by evaporation in vacuo, and the residue was dissolved in about 100 ml. of water, washed with about 100 ml. of ether and the aqueous solution was made basic with ammonium hydroxide. An oil consisting of β-pyrrolidinoisobutyrophenone formed and was extracted with three 50 cc. portions of ether, the ether extracts were dried over magnesium sulfate and fractionally distilled in vacuo.

β-pyrrolidinoisobutyrophenone thus prepared boiled at about 117–118° C. at the pressure of 0.3 mm. of mercury. The index of refraction at 26° C. was 1.5302.

Analysis:
Calculated for $C_{14}H_{19}NO$: N, 6.45
Found: N, 6.50

A solution of 54.2 gms. of β-pyrrolidinoisobutyrophenone in 100 cc. of ether was added dropwise to a Grignard agent prepared from 24.3 gms. of magnesium, 63.3 gms. of benzyl chloride and 600 ml. of ether. The reaction mixture was refluxed for one hour and then decomposed by the addition of saturated ammonium chloride solution. The ether layer containing the 1,2-diphenyl-2-hydroxy-3-methyl-4-pyrrolidinobutane formed in the reaction was removed and dried over anhydrous magnesium sulfate. Anhydrous hydrogen chloride gas was bubbled into the ether solution and the precipitated hydrochloric acid addition salt was removed and recrystallized from a mixture of ethyl acetate and methanol with the addition of ether.

The α - dl - 1,2-diphenyl - 2 - hydroxy - 3 - methyl-4-pyrrolidinobutane hydrochloride thus prepared melted at about 188–189° C.

Analysis:
Calculated for $C_{21}H_{27}NO \cdot HCl$: N, 4.05; Cl, 10.25
Found: N, 4.13; Cl, 10.10

Evaporation of the mother liquors from recrystallization of α-dl-1,2-diphenyl-2-hydroxy-3-methyl-4-pyrrolidinobutane hydrochloride yields β-dl-1,2-diphenyl-2-hydroxy-3-methyl-4-pyrrolidinobutane hydrochloride melting at about 202–203° C.

A reaction mixture containing 10 gms. of α-dl-1,2-diphenyl-2-hydroxy-3-methyl-4-pyrrolidinobutane hydrochloride, 10 ml. of pyridine and 10 ml. of propionic anhydride was refluxed for about two hours. The reaction mixture was cooled and ether was added to the point of cloudiness whereupon α-dl-1,2-diphenyl-2-propionoxy-3-methyl-4-pyrrolidinobutane hydrochloride precipitated. On recrystallization from a mixture of ethyl acetate and methanol, the material melted at about 196–197° C. with decomposition.

Analysis:
Calculated for $C_{24}H_{31}NO_2 \cdot HCl$: N, 3.49; Cl, 8.82
Found: N, 3.74; Cl, 8.77

EXAMPLE 4

*Preparation of 1,2-diphenyl-2-acetoxy-3-methyl-4-pyrrolidinobutane hydrochloride*

A reaction mixture containing 10 gms. of 1,2-diphenyl-2-hydroxy-3-methyl-4-pyrrolidinobutane hydrochloride prepared according to the procedure of Example 3, 10 ml. of pyridine and 10 ml. of propionic anhydride was refluxed for about two hours. The reaction mixture was cooled and ether was added to the point of cloudiness. A precipitate consisting of the α-dl-1,2-diphenyl-2-acetoxy-3-methyl-4-pyrrolidinobutane hydrochloride formed in the reaction was obtained, and melted at 202–203° C. with decomposition after recrystallization from a mixture of ethyl acetate and methanol, with the addition of ether.

Analysis:
Calculated for $C_{23}H_{29}NO_2 \cdot HCl$: N, 3.61; Cl, 9.14
Found: N, 3.57; Cl, 9.06

EXAMPLE 5

*Preparation of α-dl-1,2-diphenyl-2-propionoxy-3-methyl-4-dimethylaminobutane*

A mixture of 2 g. of α-dl-1,2-diphenyl-2-propionoxy-3-methyl-4-dimethylaminobutane hydrochloride (prepared according to the procedure of Example 1), 50 ml. of dilute ammonium hydroxide and 50 ml. of ether was shaken and the ether layer was removed. The ether solution of the free base formed in the reaction was dried over anhydrous magnesium sulfate and the ether was removed by evaporation in vacuo. The residual oil was crystallized from petroleum ether.

α - dl - 1,2 -diphenyl-2-propionoxy-3-methyl-4-dimethylaminopropane thus prepared melted at 70–71° C.

Analysis:
Calculated for $C_{22}H_{29}NO_2$: N, 4.13
Found: N, 4.11

α - dl - 1,2 - diphenyl - 2 - acetoxy -3-methyl-4-dimethylaminobutane, α - dl - 1,2 - diphenyl -2-acetoxy-3-methyl-4-pyrrolidinobutane and α-dl-1,2-diphenyl-2-propionoxy-3-methyl-4-pyrrolidinobutane are obtained from their respective hydrochloride salts by substantially the same procedure as set forth above. The bases are obtained as oils which crystallize only after standing for upwards of several weeks.

EXAMPLE 6

*Preparation of acid addition salts of α-dl-1,2-diphenyl-2-propionoxy-3-methyl-4-dimethylaminobutane*

To a solution of 3.39 g. (0.01 mol) of α-dl-1,2-diphenyl-2-propionoxy-3-methyl-4-dimethylaminobutane (prepared according to the procedure of Example 5) in 10 ml. of ethanol are added 4.9 ml. of 10 percent aqueous sulfuric acid (0.005 ml.). The solution is thoroughly stirred and then evaporated to dryness in vacuo. A solid residue of α - dl - 1,2 - diphenyl - 2 - propionoxy - 3 - methyl - 4 - dimethylaminobutane sulfate is obtained.

The same procedure is followed except that stoichiometrically equivalent quantities of nitric acid, phosphoric acid, acetic acid and benzoic acid are used. The nitrate, phosphate, acetate and benzoate of α-dl-1,2-diphenyl-2-propionoxy-3-methyl-4-dimethylaminobutane respectively are recovered.

I claim:

1. A compound selected from the group consisting of the α-dl form of a base represented by the formula

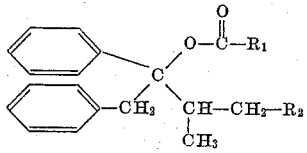

wherein $R_1$ represents a member of the group consisting of methyl and ethyl radicals, and $R_2$ represents a member of the group consisting of dimethylamino and pyrrolidino radicals; and acid addition salts thereof.

2. α-dl-1,2-diphenyl-2-propionoxy-3-methyl-4-dimethylaminobutane hydrochloride represented by the formula

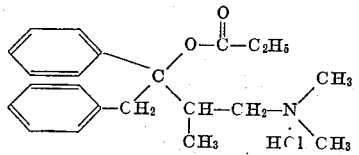

3. α-dl-1,2-diphenyl-2-acetoxy-3-methyl-4-dimethylaminobutane hydrochloride represented by the formula

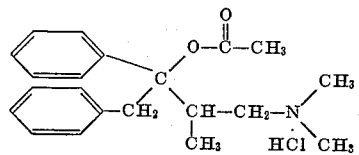

4. α-dl-1,2-diphenyl-2-acetoxy-3-methyl-4-pyrrolidinobutane hydrochloride represented by the formula

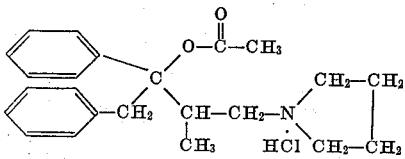

5. α-dl-1,2-diphenyl-2-propionoxy-3-methyl-4-pyrrolidinobutane hydrochloride represented by the formula

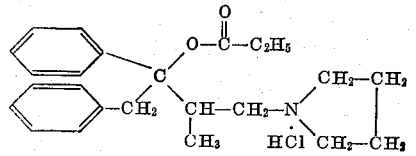

6. α-dl-1,2-diphenyl-2-propionoxy-3-methyl-4-dimethylaminobutane.

References Cited in the file of this patent
UNITED STATES PATENTS 2,649,445  Speeter _____ Aug. 18, 1953

FOREIGN PATENTS 615,136  Great Britain _____ Jan. 3, 1949